United States Patent Office
2,867,433
Patented Jan. 6, 1959

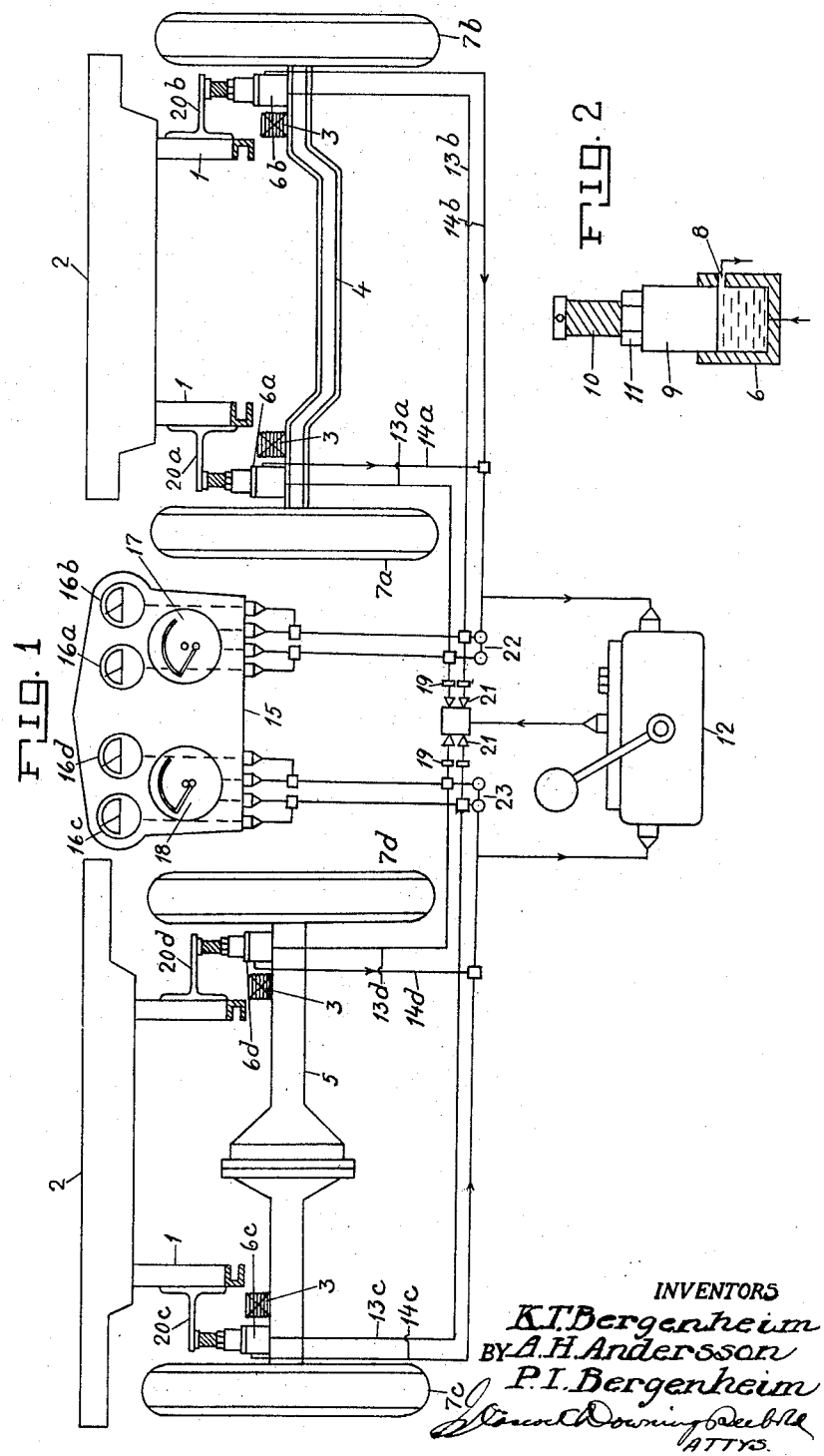

2,867,433

LOAD WEIGHING DEVICE FOR LORRIES

Karl Torsten Bergenheim, Ljungskile, and Arthur Helge Andersson and Per Ingemar Bergenheim, Goteborg, Sweden Application March 29, 1954, Serial No. 419,444

Claims priority, application Sweden February 18, 1954

2 Claims. (Cl. 265—40)

This invention relates to certain novel improvements in load weighing devices for lorries and such like and the primary object of the present invention is to provide a weighing device enabling the direct determination of the net weight of a load, placed on the platform body of the lorry.

Another object of the present invention is to provide a load weighing device for lorries which enables the weighing to be done at any place along the route of the lorry.

A further object of the present invention is to provide a load weighing device for lorries which enables the determination of the load weight on each wheel axle.

With these and other objects in view the invention is chiefly characterised in that the load weighing device is placed on and carried by the lorry itself and the weighing is carried out by weighing means carried between the platform construction and the wheel axles of the lorry.

In the accompanying drawing:

Figure 1 is a diagrammatic rear elevation view of both axles of the lorry placed at the side of each other and coupled to a common load weighing device, and Figure 2 a vertical section of a detail of this device in a somewhat larger scale.

The supporting construction 1 for the platform body 2 and the motor, not shown on the drawing, rests on body springs 3, which on their part are borne up by the fore axle 4 and back axle 5 of the motor-lorry. Between the supporting construction 1 and the two axles 4, 5 the active weighing means of the load weighing device are inserted.

These weighing means conveniently consist of four hydraulic cylinders, of which the hydraulic cylinders 6a and 6b are fitted at the fore axle 4 near the front wheels 7a and 7b, and the hydraulic cylinders 6c and 6d at the rear axle 5 near the rear wheels 7c and 7d.

Each hydraulic cylinder, standing in vertical position, has an upper bleed off opening 8 in the cylinder wall for the pressure liquid, oil, etc., and therefore the piston 9 of the hydraulic cylinder 6 cannot be pressed higher than to this upper limit, where the piston exposes the opening 8.

In the upper, external end of the piston a regulating screw 10 with flat head is axially threaded in and provided with a stop nut 11, which, screwed on to rest against the piston, locks the adjusting screw in adjusted position.

A pressure pump 12, exemplified as a hand pump, is by means of feed pipes 13a, 13b, 13c, 13d and return pipes 14a, 14b, 14c, 14d coupled to the hydraulic cylinders, the return pipes being coupled to the openings 8 of the hydraulic cylinders. For reading off the liquid pressure a guage plate 15 is placed in the driver's cab of the lorry. On each pressure pipe a pressure gauge 16a, 16b, 16c, 16d is put up, graduated for reading off the total pressure of the load in pounds. For each axle 4, 5 there are consequently two manometers, and for each manometer pair an adding manometer 17 or 18 coupled with both needle and movable scale, so that the total weight, i. e. the total load on each axle can be read off.

Each pressure pipe to the hydraulic cylinders is conveniently provided with a flow restriction 19 to keep the oil stream within suitable limits, and each hydraulic cylinder 6a, 6b, 6c, 6d is at the shaft placed in such a way that its adjusting screw 10 is with its head positioned below a horizontal arm 20a, 20b, 20c, 20d or the like, extending from the construction 1 bearing up the platform body. Each pressure pipe for the hydraulic cylinders is also conveniently provided with a non-return valve 21.

The load weighing device must be calibrated with regard to the tare weight of the bearing construction (the platform body etc.) in order to indicate the exactly right load weight. This calibration is made at the assemblage of the load weighing device on the lorry, and it is not necessary to repeat the calibration until the spring function of the body springs is possibly altered later on. The calibration is performed with no load on the platform body of the lorry. The hydraulic pistons are raised by means of the pressure pump to the position where openings 8 are exposed. In this position all of the pistons may be said to be level with each other, and are supported solely on oil. The adjusting screws 10 are turned up till their heads bear firmly against the corresponding horizontal arm 20a, 20b, 20c, 20d without raising the platform body. In this position the adjusting screws are locked by means of the stop nuts 11, and any load placed on the platform body will consequently put pressure only on the pistons, and will not press on the body springs, which only take the weight of the platform body etc. After the calibration the pistons are lowered in the way mentioned below.

The load weighing device operates as follows:

When a load, placed on the platform body, is to be weighed, which weighing is carried out when the lorry is stopped at any place on its route, oil is pumped through the pressure pump into the hydraulic cylinders, and the hydraulic pistons are driven upwards, and after contact with corresponding horizontal arm they raise the platform body with its load upwards, until the pistons have been raised so high that the outlets 8 have been opened. In this position the pistons are resting on the oil pads in the cylinders. At this point, due to the calibration explained above, only the load will press on the pistons, which pressure is transmitted to the pressure oil in the pipe lines, and the load weight can be read off in pounds on the manometers. Through this arrangement the pressure at each hydraulic cylinder, corresponding to the pressure on the nearest wheel, can be read off, as well as the load pressure on each axle, which pressure is indicated by the sum-manometers. After reading off the pressures, the pump is stopped and the pistons are lowered again through return conducting of the oil. This can be made through ordinary valves from the pressure side to the suction side of the pump indicated at 22 and 23 of the drawing. Relief valves not shown are, if desired, fitted on the pipe lines as well as a safety valve, which transmits oil from pressure side to suction side at too high a pressure.

Through this weighing apparatus for lorries, the load weight of the lorry can be determined in a very simple way at any time and on any place during the transport.

In view of the foregoing description taken in conjunction with the accompanying drawing it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims. For instance the hydraulic cylinders may be of telescopic type. The pressure pump can be driven by the motor of the lorry or battery driven.

Having described the invention, what is claimed as new is:

1. In a weighing device for the cargo of a motor lorry having a plurality of hydraulic cylinders and cooperating pistons acting as individual weighing devices mounted between the lorry axles and the platform body, manometers calibrated to read in pounds connected to said hydraulic cylinders, pump means to supply hydraulic fluid to the hydraulic cylinders, an inlet in the cylinder below the piston in the lowest position of the same, an outlet positioned above the inlet and covered by the piston in said position, a separate fluid branch for each cylinder from the main pressure pipe of the pump connected to the inlet, each of said fluid branches being provided with a flow restriction, and a separate fluid branch from the main suction pipe of the pump connected with the outlet, the piston in its uppermost position being held up by the fluid pressure clearing the outlet for circulation of the fluid through the pump, and the upper ends of the pistons bearing against the platform body when the lorry is empty, and preventing the platform when loaded from pressing the lorry springs downwardly.

2. The structure according to claim 1, wherein said pistons are axially adjustable.

References Cited in the file of this patent

UNITED STATES PATENTS

| 566,698 | Raab | Aug. 25, 1896 |
| 1,432,631 | Sonnlechner et al. | Oct. 17, 1922 |
| 1,532,835 | Schlabach | Apr. 7, 1925 |
| 1,579,658 | Pugh | Apr. 6, 1926 |
| 2,166,153 | Huck | July 18, 1939 |
| 2,465,653 | Leterman | Mar. 29, 1949 |
| 2,472,689 | Adams et al. | June 7, 1949 |
| 2,478,391 | Segerstad | Aug. 9, 1949 |
| 2,482,027 | Poole | Sept. 13, 1949 |
| 2,668,702 | Belknap | Feb. 9, 1954 |

FOREIGN PATENTS

| 112,571 | Great Britain | Jan. 17, 1918 |
| 226,530 | Great Britain | Aug. 2, 1926 |
| 301,670 | Great Britain | Dec. 6, 1928 |